Sept. 2, 1958  C. W. LITTLE, JR  2,850,697
DEVICE FOR MEASURING MAGNETOSTRICTION
Filed Oct. 19, 1954  3 Sheets-Sheet 1
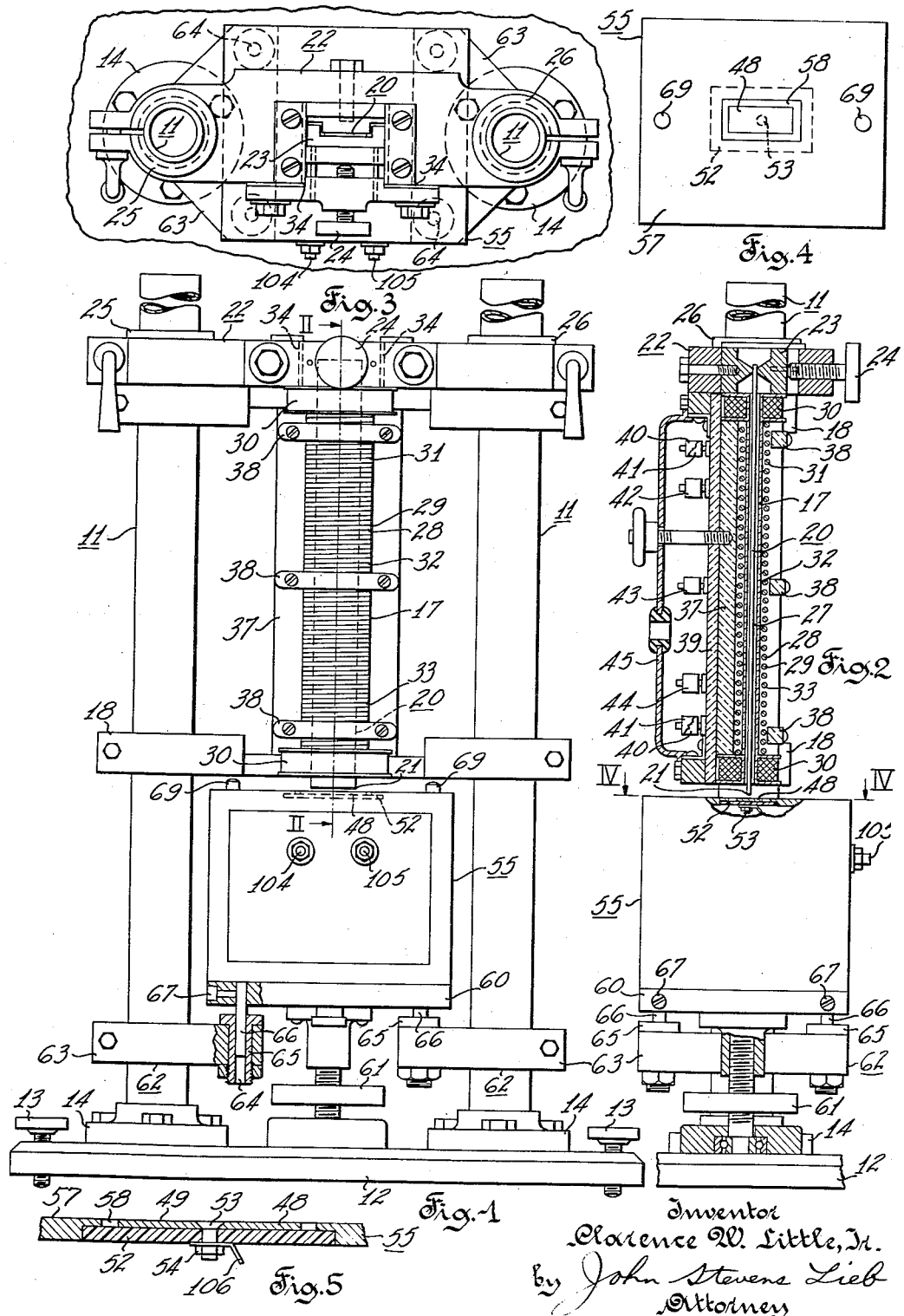
Inventor
Clarence W. Little, Jr.
by John Stevens Lieb
Attorney

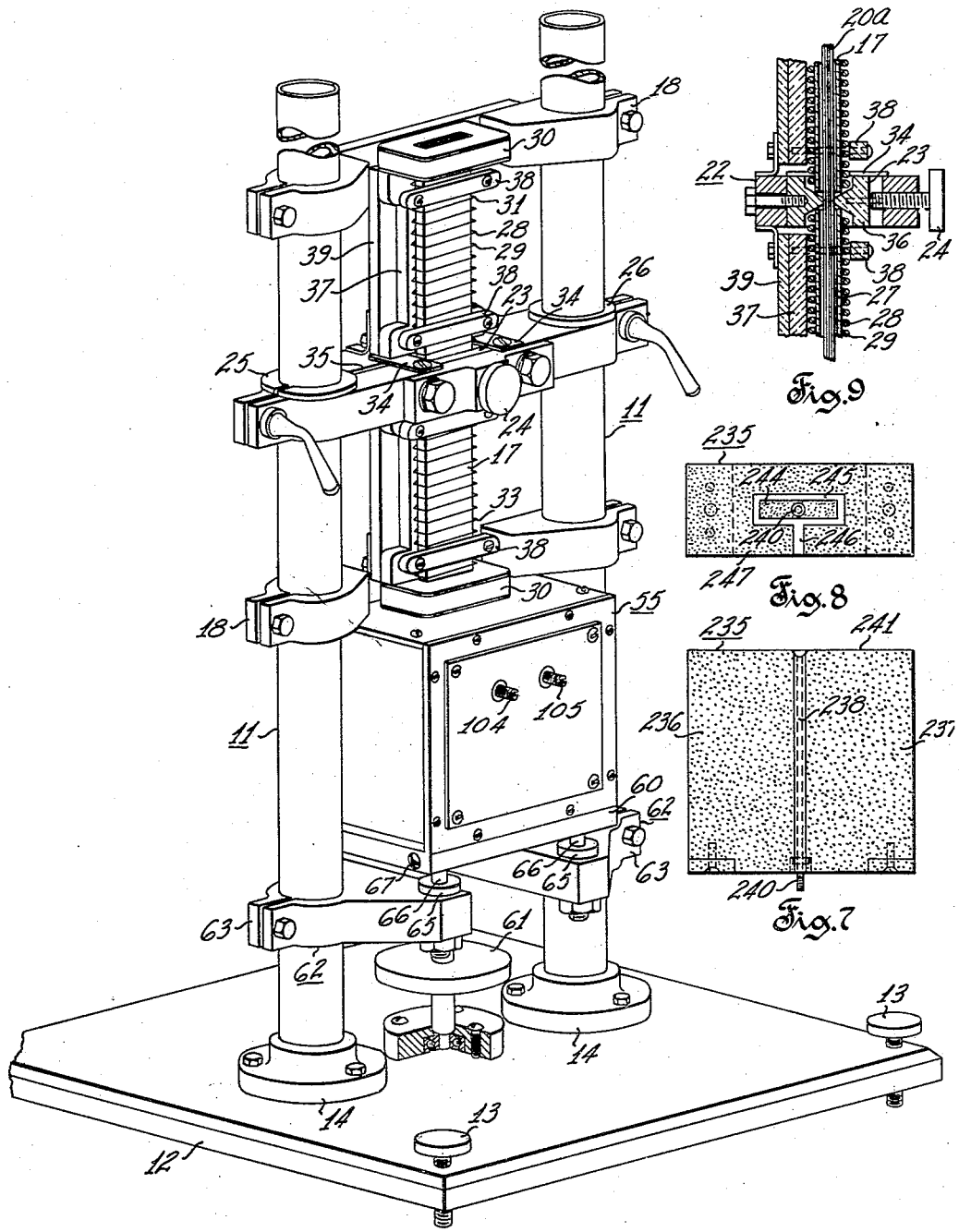

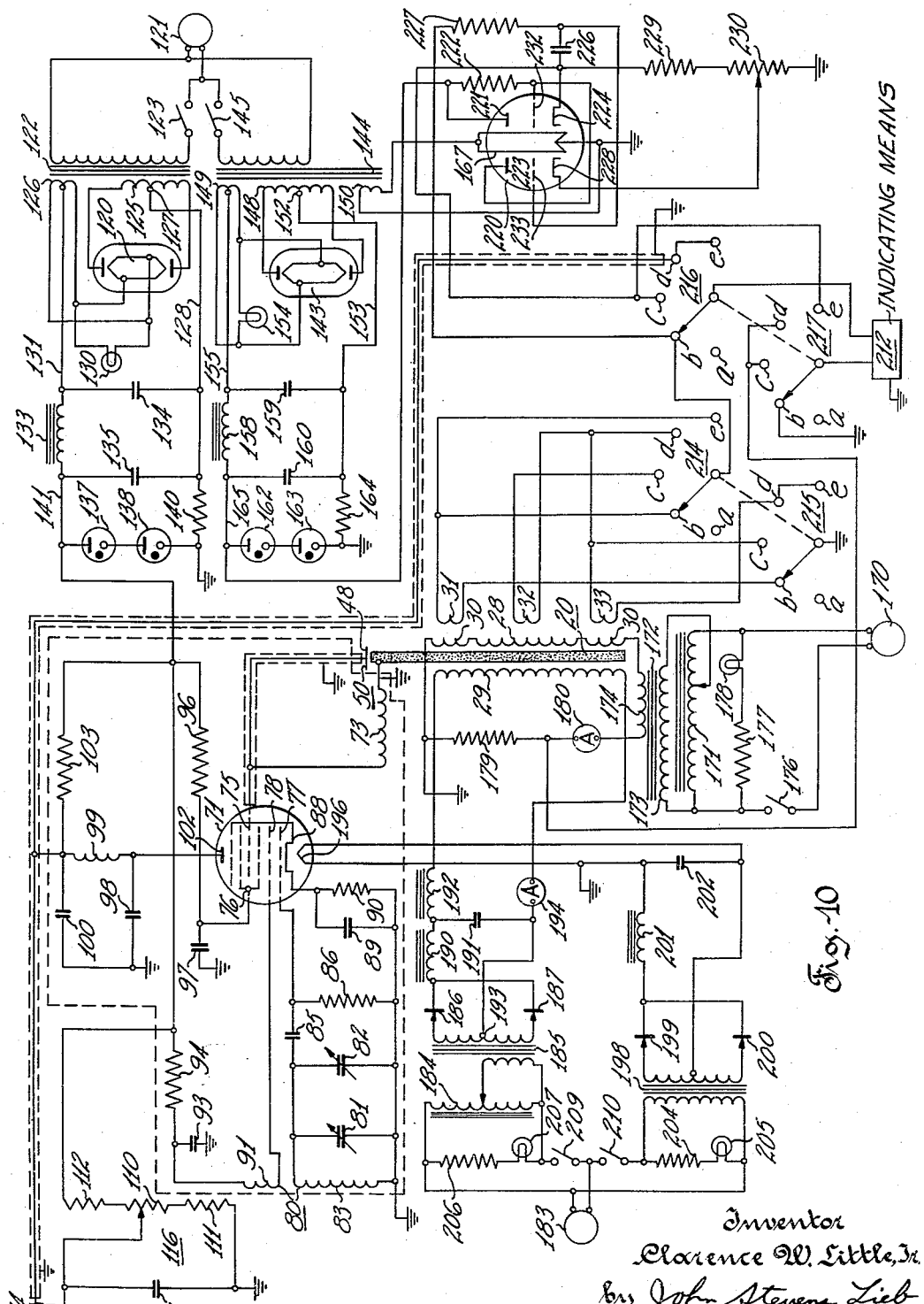

United States Patent Office 2,850,697
Patented Sept. 2, 1958

2,850,697

DEVICE FOR MEASURING MAGNETOSTRICTION

Clarence W. Little, Jr., Wauwatosa, Wis., assignor to Allis-Chalmers Manufacturing Company, Milwaukee, Wis.

Application October 19, 1954, Serial No. 463,170

25 Claims. (Cl. 324—34)

This invention relates in general to an improved method and device for measuring small linear displacements and more particularly to a method and apparatus for measuring small linear displacements of magnetostriction in various magnetic materials.

Magnetostriction, as herein used, defines the change in linear dimensions of a body, occurring when the body undergoes a change in magnetic state, which linear change is attributable only to the change in magnetic state. In particular, longitudinal magnetostriction is defined as the magnetostrictive strain (change in length per unit length) occurring in a body along the directions of the lines of magnetic flux in the body when it is magnetized.

Measuring devices which have heretofore been constructed to indicate minute changes in dimension, such as magnetostriction, have depended primarily upon mechanical magnification resulting from a system of mechanical levers, optical magnification resulting from a system of optical and mechanical levers, and electrical magnification resulting from a system of mechanical-electrical levers. While these systems are not unsuitable for the measurement of unidirectional or static linear displacements, such as might be caused by the application of a constant magnetic field to a sample of iron; the inertia, elasticity and mechanical resonance of the levers and the other parts of the system connected to the sample introduce errors which make these systems unsuitable for indicating periodic or dynamic linear displacements, such as are caused by the application of a cyclic magnetic field to a sample of iron.

Another disadvantage of certain prior art devices is that they subject the sample to mechanical stresses as contrasted to magnetic stresses. A further disadvantage of certain prior art devices is that they require the affixation of auxiliary parts such as weights and electric conductors to the sample before the magnetostriction of sample can be measured.

The measurement of magnetostriction and particularly dynamic magnetostriction is a delicate operation because the linear displacement which is being measured is of the order of $10^{-8}$ inches per inch. Because of this small magnitude of the linear displacement, external influences, such as the earth's magnetic field, ambient vibrations and eddy currents, if not compensated for, may introduce errors into the measurement. Consequently, a device for accurately measuring the magnetostriction of a sample of magnetic material must be designed to compensate for these external influences as well as accurately compare magnetostriction with other measurable magnetic characteristics of the sample, such as magnetizing force, magnetic flux density, etc.

Accordingly, it is an object of this invention to provide new and improved means for accurately measuring the magnetostriction of a magnetic material when this material is subjected to magnetization, which measuring means avoids the disadvantages of the prior art devices.

Another object of the present invention is to provide a new and improved device for accurately measuring magnetostriction of a magnetic material when the material is subjected to cyclic magnetization.

Another object of the present invention is to provide new and improved means for accurately measuring the magnetostriction of magnetic material when the material is in the same physical, chemical and metallurgical state in which it is employed in electrical apparatus, for example, a sample taken from the actual magnetic material employed in electrical apparatus.

Another object of the present invention is to provide an improved device for accurately measuring magnetostriction which will measure only those strains which are caused by a change in magnetic state.

Another object of the present invention is to provide an improved device for accurately measuring magnetostriction which measurement is insensitive to strains of other kinds, such as those caused by thermal expansion.

Another object of the present invention is to provide an improved device for accurately measuring magnetostriction which measurement is insensitive to phenomena other than the magnetically induced strain.

Another object of the present invention is to provide an improved device for accurately measuring magnetostriction which eliminates the longitudinal component of magnetostriction caused by stray D. C. magnetic fields, such as the earth's magnetic field.

Another object of the present invention is to provide an improved device suitable for the accurate measurement of either static or periodic alternating linear displacements of extremely small magnitude, such as static and dynamic magnetostriction.

Another object of the present invention is to provide an improved device for accurately measuring magnetostriction which employs an electrical circuit including the sample to be measured.

Another object of the present invention is to provide an improved device for measuring magnetostriction which eliminates cumbersome and complex mechanical lever and optical lever systems.

Another object of the present invention is to provide an improved device in which the magnetostriction of a sample can be easily and accurately related to the degree of magnetic induction therein.

A further object of the present invention is to provide an improved device capable of accurately measuring strains whose magnitudes are between $10^{-8}$ inches per inch and $10^{-4}$ inches per inch.

A further object of the present invention is to provide an improved device for measuring magnetostriction which is capable of erasing the magnetic history of the material being measured.

A further object of the present invention is to provide an improved device for measuring magnetostriction capable of fixing a reproducible magnetic state in the material being measured.

A further object of the present invention is to provide an improved device for measuring magnetostriction which will supply and indicate the magnitude of a desired degree of magnetization of, or magnetic flux density in the material being tested.

A further object of the present invention is to provide an improved device which is capable of simultaneously measuring flux density, magnetizing force, and magnetostriction.

A further object of the present invention is to provide an improved device for accurately measuring magnetostriction which will not, by its mechanical arrangement or nature, produce mechanical stress as opposed to magnetic stress in the sample being measured.

A further object of the present invention is to provide an improved device for accurately measuring magnetostriction which will not inhibit in any way, such as by friction, the magnetostrictive strain of the sample.

A further object of the present invention is to provide an improved device for accurately measuring dynamic magnetostriction which will not alter the mechanical impedance of the sample.

A further object of the present invention is to provide an improved device for accurately measuring magnetostriction which will not inhibit in any way the free longitudinal vibration of the sample.

A still further object of the present invention is to provide an improved device for accurately measuring magnetostriction capable of performing its measurement on the samples of magnetic material which are used in other magnetic testing apparatus.

A still further object of the present invention is to provide an improved device for accurately measuring magnetostriction which can be quickly calibrated.

A still further object of the present invention is to provide an improved device for accurately measuring magnetostriction which will maintain its calibration for a reasonable time under ordinary ambient conditions of temperature, humidity and vibration.

A still further object of the present invention is to provide an improved device for accurately measuring magnetostriction in which the procedure of measurement shall be simple and the time required to change samples shall be short compared to the time required for measurement.

A still further object of the present invention is to provide an improved device for accurately measuring magnetostriction in which no sample material shall be expended by the measurement.

A still further object of the present invention is to provide an improved method for measuring magnetostriction with a high degree of accuracy, which method is easily and quickly performed.

Other objects will appear hereinafter as the description of the invention proceeds.

The objects of the invention may be realized by the device and method described in detail in the following specification.

The invention will appear more clearly from the following detailed description when taken in connection with the accompanying drawings, showing by way of example, a preferred embodiment of the inventive idea and modifications thereof.

In the drawings, Fig. 1 is an elevation view of a magnetostriction measuring device embodying the invention;

Fig. 2 is a side elevation view partly in section taken generally along line II—II of Fig. 1;

Fig. 3 is a top or plan view of the device of Fig. 1;

Fig. 4 is a plan view of the micrometer circuit housing of the device of Fig. 1 taken along line IV—IV of Fig. 2;

Fig. 5 is an enlarged fragmentary view in vertical section of a portion of the top of the micrometer circuit housing showing the electric conductor plate of the device illustrated in Fig. 1;

Fig. 6 is an isometric view of an alternative embodiment of this invention;

Fig. 7 is a front view of an alternative embodiment of the electric conductor plate shown in Fig. 5;

Fig. 8 is a top or plan view of the electric conductor plate of Fig. 7;

Fig. 9 is a fragmentary view in vertical section of the clamping means of the device shown in Fig. 6 showing the jaws of the clamping means in closed position; and Fig. 10 is a diagram showing the electric circuit of an embodiment of the invention.

As shown in Figs. 1 and 6 of the drawings, the invention is illustrated in a device having a pair of support posts 11, mounted in parallel and spaced relationship to each other and normal to a base member 12. Base member 12 is provided with suitable means for leveling the device such as, for example, screws 13. The posts 11 are secured to base 12 by any suitable means such as collars 14. Posts 11 may be hollow and filled with a heavy viscous sound energy absorbing material.

A hollow coil form 17 is supported intermediate of and parallel to posts 11 by a plurality of extending coil form supports 18.

Coil form 17 is shaped to receive therein a strip or sample 20 of magnetic material whose magnetostrictive properties are to be determined.

The strip 20 normally is of rectangular shape. The dimensions of the strip are such that the strip can readily be inserted into and withdrawn from the coil form 17. Strips similar to those used in the Epstein Core Loss test are suitable for use in the device of the invention.

The strip 20 extends below the coil form 17 to present an end having a plane surface 21 substantially normal to the longitudinal axis of the coil form 17.

Means for suspending the strip 20 inside coil form 17 comprises clamping means 22 positioned above the coil form 17 in the embodiment of Fig. 1 and intermediate the ends of coil form 17 in the alternative embodiment of Fig. 6. Clamping means 22 is detachably connected to posts 11 so its position relative to the posts may be adjusted. Clamping means 22 has an adjustable jaw 23, which is opened and closed by suitable adjusting means, such as screw 24, for gripping strip 20 after it has been inserted through the open jaw 24 into coil form 17 and holding it in the dashed line position shown in Fig. 1 free from contact with the coil form.

The mechanical connections between clamping means 22 and pair of posts 11 have nonconductive bushing 25 at one post and conductive bushing 26 at the other to provide an electrical connection between sample 20 and the common ground.

"The common ground," as herein used, defines that connection at which the electric potential is a predetermined amount. The potential may be earth potential or some other selected figure.

A small clearance 27 is provided between the vertical sides of the sample 20 and the inner surface of the coil form 17 to air-damp the transverse or flexural vibrations of the sample without introducing any appreciable frictional interference or air-damping into the longitudinal vibrations of the sample. Strip 20 is therefore free to vibrate longitudinally under the influence of a magnetic field without touching the sides of coil form 17.

A magnetizing coil or exciting means 28 for inducing a magnetic field in a predetermined direction in sample 20, and a neutralizing coil 29 for compensating for stray D. C. magnetic fields (e. g. earth's magnetic field) in the sample are wound around coil form 17 and may be energized by any suitable source of current.

The magnetizing coil 28 is provided with an increased number of turns per inch at its end portions 30 to maintain a substantially uniform magnetic field throughout the coil form 17.

Pickup coils 31, 32, and 33 are respectively positioned on one end, at the center, and on the other end of coil form 17 to provide means for monitoring the magnetic flux density.

Coils 28, 29, 31, 32, and 33 are represented schematically in Fig. 1.

The clamping means 22 suspends the long axis of the strip vertically in such a manner that the strip can vibrate longitudinally within magnetizing coil 28 without having an interfering friction drag with the sides of coil form 17.

The clamping point for the strip is at a portion thereof remote the end of the sample having plane surface 21 and in the embodiment of Fig. 6 is at the region of the center of mass of the sample, since, for the sample illustrated, this region coincides with the natural nodal plane for the magnetostrictive vibrations.

The natural node region clamping (illustrated in Figs. 6 and 9) provides an ideal arrangement since in this region, the clamping means need only support the sample and it is not required to react against magnetostrictive vibratory forces. For convenience, however, when measuring a sample having small mass, such as a single strip, the clamping means grips the end of the strip. This is possible since the magnetostrictive vibratory forces in a sample having small mass are of such magnitude as to enable the creation of an artificial nodal plane adjacent the strip end without affecting the actual measurement.

When measuring samples having larger mass, such as a plurality of strips, it is preferable to use natural node region clamping since clamping in the natural node region eliminates variations of the effective nodal plane between samples of different mass by causing the effective nodal plane to coincide with the natural nodal plane.

"Effective nodal plane," as herein used, defines that plane about which magnetostrictive vibrations occur in a sample suspended in the device of this invention.

"Natural nodal plane," as herein used, defines the plane about which magnetostrictive vibrations occur in a sample in free space.

When natural node region clamping is used, the parts of the clamping means 22 are insulated from each other to prevent the formation of a closed conducting loop around the sample through which a short circuit current, induced by the field of the magnetizing coil, could flow. The insulation of clamping means 22 is provided in the embodiment illustrated by previously described nonconductive bushing 25, a plurality of insulating members 34 (shown in Fig. 3) positioned adjacent jaw 23 on each side thereof, an air gap 35 (shown in Fig. 6) extending between jaw 23 and bushing 25, and a nonconductive jaw bit 36 positioned adjacent to jaw adjusting means 24.

Coil form 17 is made rigid by being detachably secured to a backing member 37 by any suitable fastening means such as brackets 38. A terminal board member 39 supporting a plurality of pairs of output terminals 40, 41, 42, 43, and 44, is connected to backing member 37 and is enclosed by a detachable cover plate 45. Pairs of output terminals 40, 41, 42, 43, and 44 (only one terminal of pairs 42, 43, and 44 being shown in Fig. 2) are provided for the ends of coils 28, 29, 31, 32, and 33, respectively.

An electric conductor plate 48 shown in dashed line below sample 20 in Fig. 1 having a mirrorlike plane metallic surface 49 is positioned below coil form 17 in opposing spaced relationship to the plane surface 21 presented by the sample 20. The plate 48 cooperates with the end of the sample 20 having plane surface 21 to provide a variable capacitor 50.

As shown in more detail in Fig. 5, electric conductor plate 48 is supported by an insulating member 52 of suitable material, such as an acrylic resin, like Plexiglas, and secured thereto by any suitable means such as conductive bolt 53 and nut 54. Insulating member 52 in turn is secured to and supported by a metallic housing, such as box 55. Housing 55 has a suitable opening in its top in which the plate 48 is positioned in insulated relation thereto. The portion of the housing surrounding the plate provides a guard ring 57 around conductor plate 48 in insulated relation thereto.

In the structure of Fig. 5, guard ring 57 is shown insulated from conductor plate 48 by means of air gap 58. However it is understood that any suitable insulating material having a low dielectric constant may be interposed between guard ring 57 and conductor plate 48 within the scope of the present invention.

Housing 55 is mounted on table 60 and is vertically movable therewith in a path substantially parallel to posts 11 by suitable adjusting means, such as screw 61, operatively interposed between base member 12 and table 60. The movement of housing 55 is guided by any suitable guide means 62 such as, a plurality of extending arms 63 detachably secured to posts 11 and having holes 64 therethrough with sleeves 65 positioned therein for cooperating in slidable engagement with a plurality of pins 66 secured to table 60 by any suitable means, such as set screws 67.

By moving housing 55 vertically, plate 48 is either moved toward or away from sample 20 so as to vary the space between the plate 48 and the sample 20 and change the capacity of capacitor 50.

Suitable stop means or gross indexing means such as, for example, protruding lugs 69, are provided cooperatively interposed between coil form support 18 and housing 55 to limit the movement of housing 55 toward coil form 17 and to keep stray capacity variation low by positioning conductor plate 48 in substantially the same location for every sample tested.

The previously described structure is rendered the operable device of the invention by the incorporation of a suitable electrical circuit such as is illustrated as exemplary by Fig. 10.

The circuit of Fig. 10 comprises generally a capacitive micrometer circuit, a plurality of D. C. power supplies, an integrating circuit, an A. C. power supply, and a selective switching arrangement.

The capacitive micrometer circuit comprises a tunable circuit, a suitable electric coupling means, such as multigrid converter vacuum tube 71; and an oscillator circuit electrically connected together as follows: the tunable circuit comprises variable capacitor 50 (consisting of sample 20 capacitively coupled to electric conductor plate 48) connected in parallel with inductor 73.

The tunable circuit is connected in series to a control grid 75 of tube 71. A screen grid 76 provides a shield for the control grid 75 to reduce the capacitance between the control grid 75 and oscillator grids 77 and 78 to a negligible value. As the plate spacing of capacitor 50 varies, the energy absorbing characteristic of the tunable circuit is altered thereby changing the apparent resistance of tube 71. The change in apparent resistance therefore results in a change in plate current of tube 71.

The electrically grounded shielding provided by housing 55 and insulating member 52 (previously described) is indicated by dashed lines.

The oscillator circuit comprises R. F. transformer 80, a pair of variable capacitors 81 and 82 connected in parallel to the secondary winding 83 of transformer 80, one of which is connected to the common ground. By varying capacitors 81 and 82, the secondary winding 83 of transformer 80 is tuned to provide a fixed frequency sine wave voltage. Connected across the secondary winding of transformer 80 is a grid leak comprising a capacitor 85 and a resistor 86. The grid leak provides means whereby the oscillations are self-maintaining. Secondary winding 83 has one end electrically connected to grid 77 of tube 71 and the other end connected to the common ground.

Cathode 88 of tube 71 is provided with a self-bias circuit comprising capacitor 89 in parallel with resistor 90.

One lead from the primary winding 91 of R. F. transformer 80 is connected in series with a low pass R. F. filter comprising capacitor 93 and resistor 94 while the other lead is connected in series to grid 78 of tube 71. Capacitor 93 is connected to the common ground.

Screen grid 76 is connected to a screen bypass filter comprising resistor 96 and capacitor 97.

A R. F. pi filter comprising capacitor 98, R. F. choke 99, and capacitor 100 is connected to anode 102 of tube 71 to filter out the high frequency signal and permit the fluctuating D. C. level signal to pass. One side of the R. F. pi filter is connected to the common ground.

A plate load resistor 103 is provided between the first D. C. power supply and the R. F. pi filter to provide an output voltage signal developed from and directly proportional to the D. C. plate current of tube 71.

The change in output voltage across resistor 103 is, therefore, directly proportional to the linear displacement of the sample 20.

The capacitive micrometer circuit, hereinbefore described, is mounted in housing 55 which acts as an electrostatic shield for the circuit. Variable capacitors 81 and 82 have operating shafts 104 and 105, respectively, extending through the housing whereby the capacitors may be adjusted from outside the housing. One end of inductor 73 is electrically connected through lug 106, nut 54 and bolt 53 to the conductor plate 48.

Means for determining the operating range of the micrometer circuit comprises a high impedance voltmeter, such as a vacuum tube voltmeter 108, one terminal of which is connected to the variable tap of resistor 110 electrically interposed between fixed resistors 111 and 112 and the other terminal of which is connected to the output terminal 114 of the capacitive micrometer circuit. The three resistors 110, 111 and 112 form a voltage divider 116, one terminal of which is connected to the common ground and the other terminal of which is connected to the first D. C. power supply. Capacitor 117 is connected between the tap of voltage divider 116 and the common ground to function as a low pass filter.

The voltage divider provides an adjustable voltage reference for the micrometer output voltage to enable the micrometer to be rapidly set or reset to its reference point. It is preferable to have the voltage divider provide a D. C. voltage corresponding to the D. C. voltage level of the micrometer circuit at the middle of its linearly sensitive region. This voltage is about the same for different sensitivities and, once chosen, can be left undisturbed. The correct position of the electric conductor plate 48 is indicated by a null or zero voltage on voltmeter 108. Usually two such nulls are observed corresponding to the desired voltage magnitude on either the positive or negative slope of the calibration curve (the calibration curve is essentially the curve of the frequency response of a single tuned circuit).

The first D. C. power supply comprises a suitable rectifier, such as vacuum tube 120, and an alternating current power supply 121 connected to the primary windings of transformer 122 through suitable switching means 123.

Transformer 122 is provided with a pair of center tapped secondary windings 125 and 126.

Transformer secondary winding 125 is connected to the plates of rectifier 120, and has a center tap 127 to which a first output lead 128 is connected.

Transformer secondary winding 126 is connected to the filament of rectifier 120. A pilot lamp 130 is connected across winding 126 to indicate the passage of current therethrough. The center tap of winding 126 is connected to second output lead 131. A choke or inductor 133 is connected in series with second lead 131 and capacitors 134 and 135 are connected across the output leads 128 and 131, one on the transformer side and one on the other side of choke 133, respectively, the choke and the capacitors providing a filter circuit for removing pulsating D. C. signals from the transmitted signal thereby enabling the power supply to deliver a uniform D. C. current.

Suitable voltage regulator means, such as gas filled voltage regulator tubes 137 and 138, are serially connected across the filter output leads. Current limiting resistor 140 is inserted between lead 128 and one terminal of the voltage regulator. The aforementioned terminal of the voltage regulator is connected to the common ground. The voltage regulator means maintains a uniform voltage across the circuit by raising or lowering the total current through resistor 140, which is connected in series with the load and the tubes 137 and 138 so as to compensate for any change in the load. Filter output lead 141 connects to, and provides the D. C. power supply for, the capacitive micrometer circuit.

A second D. C. power supply comprises a suitable rectifier, such as vacuum tube 143, and an alternating current power supply 121 connected to the primary winding of transformer 144 through suitable switching means 145.

Transformer 144 is provided with a pair of center tapped secondary windings, 148 and 149, and a third secondary winding 150.

Transformer secondary winding 148 is connected to the plates of rectifier 143 and has a center tap 152 to which a first output lead 153 is connected.

Winding 149 is connected to the filament of rectifier 143. A pilot lamp 154 is connected across winding 149 to indicate the passage of current therethrough. The center tap of winding 149 is connected to second output lead 155. A choke or inductor 158 is connected in series with second lead 155 and capacitors 159 and 160 are connected across the output leads 153 and 155, one on the transformer side and one on the other side of choke 158, respectively, the choke 158 and capacitors 159 and 160 providing a filter circuit for removing pulsating D. C. signals from the transmitted signal thereby enabling the power supply to deliver a uniform D. C. current.

Suitable voltage regulator means, such as gas filled voltage regulator tubes 162 and 163 are serially connected across the filter output leads. Current limiting resistor 164 is inserted between lead 153 and one terminal of the voltage regulator. The aforementioned terminal of the voltage regulator is connected to the common ground. The voltage regulator means maintains a uniform voltage across the circuit by raising or lowering the total current through resistor 164 which is connected in series with the load and the tubes 162 and 163 so as to compensate for any change in the load. Filter output lead 165 connects to, and provides the D. C. power supply for the integrating circuit.

Winding 150 is connected directly to the filament 167 of integrating circuit tube, which circuit will henceforth be more fully explained.

Means for energizing magnetizing coil 28 comprises a suitable power supply circuit consisting of an alternating current supply source 170 connected to an autotransformer 171. A transformer 172 has a primary winding 173 connected to autotransformer 171 and has a secondary winding 174 connected to coil 28. A switch 176 is connected in series with the autotransformer 171 to enable the circuit to be turned on and off. Resistor 177 and pilot lamp 178 are connected across supply source 170 between switch 176 and autotransformer 171 to indicate current flow through switch 176.

A low value noninductive resistor 179 and ammeter 180 are placed in series with the magnetizing coil 28. The ammeter indicates the magnitude of the magnetizing current flowing through coil 28. Since current of the same magnitude also flows through resistor 179, the voltage drop across resistor 179 may be utilized as a measure of the magnetizing force of the field created by coil 28 when energized.

This follows from the fundamental equations:

(1) $$H = 4\pi Ni$$

(where "H" equals the magnetizing force, "$\pi$" equals 3.14159, "N" equals the number of turns in the magnetizing coil, and "$i$" equals the magnetizing current), and (2) $$E = ir$$

(where "E" equals voltage drop across a resistor, "$i$" equals the magnetizing current, and "$r$" equals the resistance across which E is measured).

Since in Equation 1, $4\pi$ equals a constant K, the following equation is true:

(3) $$H = K(i)$$

Further, since by definition, the value of resistor 179 is known to equal a second constant, $K'$, the following equation is true:

(4) $\quad E = K'(i)$

Rewriting Equations 3 and 4:

(5) $\quad i = H/K$ (6) $\quad i = E/K'$

Equating Equations 5 and 6:

(7) $\quad i = H/K = E/K'$

Rewriting Equation 7 it becomes:

(8) $\quad H = K(E/K') = K/K'(E)$

Assuming $K/K'$ equals $K''$, Equation 8 becomes:

(9) $\quad H = K''(E)$ or

(10) $\quad H = f(E)$

Means for energizing the neutralizing coil 29 comprises a full wave rectifier consisting of an alternating current source 183, an autotransformer 184 connectable to source 183 and connected to the primary winding of transformer 185. The secondary winding of transformer 185 is connected to suitable rectifying means such as selenium rectifiers 186 and 187, which in turn are connected to one terminal of a T filter comprising choke 190, capacitor 191, and choke 192. The secondary winding of transformer 185 is provided with a center tap 193 which is connected to the other terimnal of the T filter. The T filter is in turn connected to the neutralizing coil 29. An ammeter 194 is connected in series with coil 29 to indicate the D. C. level of the current flowing in the coil. It is to be understood that although a selenium full wave rectifier has been herein selected for use in this circuit, any dry type or tube type rectifier is suitable for this arrangement.

The current supply for the capacitive micrometer vacuum tube filament 196 comes from the secondary winding of transformer 198, rectifiers 199 and 200 and choke 201. The primary winding of transformer 198 is energized from A. C. power source 183. Capacitor 202 co-operates with choke 201 to provide a filter. Connected across the primary winding of transformer 198 is a circuit comprising a resistor 204 and a pilot lamp 205 connected in series. The purpose of this pilot lamp circuit is to indicate when transformer 198 is energized. A similar indicating pilot lamp circuit comprising resistor 206 and lamp 207 is connected across the input terminals of the autotransformer 184. Switches 209 and 210 are conductively interposed between power source 183 and transformers 184 and 198, respectively.

Autotransformers 171 and 184 provide a means for incrementally varying the magnetic fields produced by coils 28 and 29, respectively.

Means for selectively connecting pickup coils 31, 32, and 33 to an indicating means 212 comprises a plurality of switches 214, 215, 216, and 217. Switches 214 and 216 have their switch arms respectively mechanically joined to the switch arms of switches 215 and 217 so that the mechanically joined switches are gang operated. Each switch has five contacts identified by the switch reference character followed by the letters $a$, $b$, $c$, $d$, and $e$.

Pickup coils 31, 32 nd 33 areconnected to the selector means or switches 214, 215, 216 and 217 as follows:

Coil 31 has one terminal connected to contacts 214b, and 214e and the other terminals connected to contact 215b.

Coil 32 has one terminal connected to contact 214c and the other terminal connected to contacts 214d and 215c.

Coil 33 has one terminal connected to contact 214d and 215c and the other terminal connected to contacts 215d and 215e.

Switch 215 has its arm permanently connected to the common ground.

Switch 214 has its arm permanently connected to contact 216b.

Switches 216 and 217 have their arms permanently connected to the indicating means.

Contacts 214a, 215a, 216a and 217a are "off" positions for the selector means.

Contact 217b is connected to the common ground.

Contacts 217c and 217d are connected at the junction of resistor 179 and ammeter 180 in the magnetizing coil circuit.

The integrating circuit comprises a suitable amplifier tube, such as twin triode vacuum tube 220. The second D. C. power supply is connected directly to anode 221 of the first triode and is connected through resistor 222 to anode 223 of the second triode. Cathode 224 of the first triode is connected in series with capacitor 226 through resistor 227 to switch contact 216b to provide integration of the voltage proportional to the time-derivative-of-flux-density ($dB/dt$) signals, detected by pickup coils 31, 32, and 33, individually or additively. The integrated voltage is directly proportional to flux density ($B$). The integrated voltage appears at contacts 216c and 217e. A feedback circuit is provided between cathode 224 and the cathode 228 of the second triode and comprises a fixed resistor 229 and a variable resistor 230 serially connected to the common ground. The lead from cathode 228 is connected to the variable tap of resistor 230. Filament 167 of the twin triode tube is connected directly to transformer winding 150.

The grid 232 of the first triode is connected to the anode 223 of the second triode. The grid 233 of the second triode is connected to cathode 224 through capacitor 226.

Contacts 216d and 216e are connected to anode 102 of vacuum tube 71 through inductor 99.

A modification of the invention is desirable when the sample whose magnetostriction is to be measured comprises a bundle of strips 20a since the amplitude of the alternating magnetic flux in the bundle becomes large and the alternation of a large magnetic flux passing through the top of housing 55 causes it to vibrate. (This vibration is a result of the interaction between the varying magnetic field in the strips and the varying magnetic field caused by the eddy currents induced in the housing wall adjacent the strips.) This vibration is reduced to a negligible amount at high frequencies by substituting a rectangular block (such as block 235 shown in side elevation in Fig. 7, of a nonconductive material having a low dielectric constant and coated with a thin metallic film) for the electric conductor plate, shield, and guard ring arrangement hereinbefore described.

More specifically, the rectangular block can be of any nonconductive or insulating material such as Lucite which exhibits a low dielectric loss in the frequency range of from 1 to 20 megacycles.

Since the capacitive micrometer is operated at a frequency of about 10 megacycles, at which frequency electric current conduction takes place on the surface of conductors ("skin effect"), the substitution of block 235 with a thin metallic film for the solid conductor plate 48 does not essentially alter the operation of the capacitive micrometer circuit. The low frequency conductance of the thin metallic film, however, is low enough to prevent the eddy current vibration effect so that when bundle measurements are made, spacer block 235 is attached to the top of the housing 55 opposite coil form 17.

Block 235, as illustrated in Fig. 7, has a sufficient dimension in the direction of the magnetic field to prevent the induction of stray currents in the capacitive micrometer circuit contained in housing 55.

Block 235 is equally operative with samples comprising single strips as with samples comprising a plurality or bundle of strips. However, since the induced stray currents resulting from the magnetic field of the sample are negligibly small when single strips are measured, the block 235 may be dispensed with in favor of the simple electric conductor plate 48, illustrated in Fig. 1 and hereinbefore described.

Block 235, as shown in Fig. 7, has two discrete areas, 236 and 237 coated with a thin metallic film. Interposed between areas 236 and 237 is a strip of surface 238 devoid of the metallic film for preventing the flow of transverse current around conductive bolt 240 (shown in dashed and solid lines in Fig. 7) which extends, as previously described, between conductor plane surface 241 and housing 55 for electrically connecting the conductor surface with the capacitive micrometer circuit (shown in Fig. 10). Block 235 is secured to housing 55 by means similar to means utilized to secure plate 48 to housing 55, as illustrated in Fig. 5, except that a longer conductive bolt 240 is substituted for the shorter conductive bolt 53 of Fig. 5.

Fig. 8 is a top view of the block 235 shown in Fig. 7. Block 235 comprises a thin metallic film or electric conductor plate 244 surrounded by a gap of insulating material 245. Insulating gap 245, as illustrated, consists of a ring like area devoid of the metallic film which merges with an extension 246 of strip 238. A guard ring 247, consisting of an area coated with a thin metallic film, substantially surrounds plate 244 in insulated relation thereto. The remaining sides of block 235, not visible in the drawings, are coated with a thin metallic film to provide an electrostatic shield for bolt 240.

In the alternative embodiment shown in Fig. 6, coils 28 and 29 may be divided into two parts, one part of each of the coils being mounted above the clamping means 23 and the other part of each of the coils being mounted below the clamping means. This divided coil construction is shown in part in more detail in Fig. 9.

The structure of the magnetostriction analyzer having been described, the operation of the analyzer will now be explained.

To measure the static or dynamic magnetostriction of a sample of magnetic material the following procedure is followed.

The housing 55, table 60 and electric conductor plate 48 are moved as a unit toward coil form 17, in a path controlled by guide means 62, by the manipulation of adjusting means 61, until stop means 69 butt against coil form support 18. Sample 20 is then lowered through open clamping means 22 and coil form 17 until plane surface or face 21 of sample 20 rests upon conductor plate 48. Plane surface 21 of sample 20 is then aligned parallel to plane metallic surface 49 of conductor plate 48 by optical means using surface 49 as a mirror. When plane surface 21 of sample 20 is positioned parallel to plate 48 and in physical contact with it, the image of the sample meets the sample itself along the entire face of the sample. When the plane surface 21 of sample 20 is not parallel to conductor plate 48, a space can be observed between the sample surface 21 and its image when the mirrorlike surface 49 of the conductor plate 48 is viewed from an angle. When sample 20 is properly positioned, it is secured by and electrically connected to the jaw 23 of clamping means 22 by turning screw 24. Housing 55 is then backed away from sample 20 by adjusting means 61 until the capacity between sample 20 and conductor plate 48 is of the value required to place the micrometer in the middle of its sensitive region as indicated by high impedance voltmeter 108. This locates the housing 55 to within a millionth of an inch; and the entire operation of grossly indexing the housing by the stop means, dropping, positioning and clamping the sample, and reindexing the micrometer by observing the voltage null can be done in less than a minute.

The above described procedure for locating housing 55 is followed whether dynamic or static magnetostriction is to be measured.

For measuring dynamic magnetostriction alone, the housing 55 is located by the procedure described. Then the magnetic history of the sample is erased, that is, the sample is demagnetized by closing switch 176 and then increasing the magnitude of the magnetizing current beyond the flux saturation value of the sample and reducing the current gradually with autotransformer 171. The magnetizing current is then approximately set to produce a desired flux density. The uniformity of magnetization is observed by monitoring the magnetic field with pickup coils 31, 32, and 33 and turning selector means switches 214, 215, 216, and 217 so that the following contact arrangements indicate the stated measurements on indicating means 212:

Contacts 214b, 215b, 216b and 217b will provide a voltage proportional to $dB/dt$ in coil 31; contacts 214c, 215c, 216b, and 217b will provide a voltage proportional to $dB/dt$ in coil 32; contacts 214d, 215d, 216b, and 217b will provide a voltage proportional to $dB/dt$ in coil 33; and contacts 214e, 215e, 216b, and 217b, will provide a voltage proportional to $dB/dt$ in coils 31, 32, and 33 taken together.

The stray D. C. magnetic fields are compensated for by closing switch 209 and adjusting autotransformer 184.

The desired flux density is then accurately set by varying autotransformer 171 in view of the reading derived from pickup coils 31, 32 and 33.

The capacitive micrometer circuit and the integrator circuit are energized by closing switches 123 and 145.

The output signal voltage provided by the capacitive micrometer vacuum tube 71, the voltage measured across resistor 179, and the voltages produced by impressing the signals from the pickup coils 31, 32, and 33 on the integrating circuit are then fed to an indicating means 212 through switches 216 and 217. By moving the gang operated switches to various combinations of the five positions shown, the various voltages proportional to the magnetostriction, magnetic flux density and magnetizing force can be impressed upon indicating means 212.

The following contact positions, in addition to this previously described, provide the following measurements:

Contacts 214a, 215a, 216a, and 217a will provide no measurement as this is the "off" position for all switches. (Since, as previously described, the switch arms of switches 215 and 214 are respectively connected to the common ground and contact 216b, any time switches 216 and 217 are in their "off" position, that is, at 216a and 217a, respectively, no signal will be transmitted to indicating means 212.);

Contacts 214e, 215e, 216c and 217c will supply a voltage proportional to the magnetic flux density, B, in sample 20 and a voltage proportional to the magnetizing force, H, around sample 20 to the indicating means 212;

Contacts 214e, 215e, 216d, and 217d will supply a voltage proportional to the magnetostriction, λ, of sample 20 and a voltage proportional to the magnetizing force, H, around sample 20 to the indicating means 212;

Contacts 214e, 215e, 216e, and 217e will supply a voltage proportional to the magnetostriction, λ, of sample 20 and a voltage proportional to the magnetic flux density, B, in sample 20 to the indicating means 212.

Switches 214 and 215 have been herein described in one contact position since the other contact positions of these switches do not alter the quantity being measured, viz., $dB/dt$, but rather merely change the physical location along the sample where the measurement is made.

The output voltage of the capacitive micrometer circuit and the other voltage outputs of the magnetostriction measuring device of this invention usually vary from 0.01 volt to 10 volts maximum A. C. Consequently, any high impedance (a megohm or greater) instrument which is able to indicate or measure peak-to-peak voltages of this magnitude is useful as an indicating means 212 for the device of the invention. One of the more useful indicating means is a cathode ray oscilloscope, since it enables at least two variables to be indicated simultaneously and provides a graph of one versus the other (one voltage providing the ordinate and the second voltage providing the abscissa) every 1/60 of a second.

After the magnetostriction, flux density, and magnetizing force of the sample have been measured, the various power switches are opened, the clamping means is opened, and the sample is removed from the device. Another sample may now be inserted and the tests repeated in the manner hereinbefore described.

All of the control circuits and indicating circuits for these variables herein described are preferably grouped together on one control panel so that an operator may rapidly insert the sample, fix the magentic history of the sample, set the magnetic flux density or magnetizing force, adjust compensation for the earth's magnetic field or other D. C. magnetic fields, and select the variables to be presented to the indicating means.

To eliminate the effects of voltages induced in the circuit elements by the varying magnetic field, vacuum tube 71 is shielded by housing 55 (indicated in Fig. 10 by dashed lines) and the coils in the micrometer circuit are formed in two identical sections, additive by mutual inductance through their own magnetic fields but connected so that the voltages induced in the coils by external magnetic fields are canceled by phase opposition.

The sample 20 is schematically indicated in Fig. 10 as connected to the common ground on the end adjacent electric conductor plate 48 for ease of illustration. However, in actual operation, it is the end of the sample 20 remote from the end providing the plate variable capacitor 50 which is connected to the common ground.

The voltage null of voltmeter 108 is also used to indicate the proper spacing between sample 20 and electric conductor plate 48, since during the course of a measurement the strip temperature may change and the strip contract or expand, changing the strip-to-plate spacing in capacitor 50. This thermal strain of the strip occurs at a slow rate compared to the 120 cycles per second magnetostrictive strain caused by 60 cycles per second magnetization, and the thermal strain shows up only as a shift or drift in the average D. C. level of the micrometer output voltage. Any such shift or drift may be quickly compensated for by readjusting the position of the housing to that indicated by the voltage null on the high impedance voltmeter 108.

The entire micrometer circuit is calibrated as a unit by replacing stationary clamping means 22 by a clamp fastened to a conventional mechanical micrometer in such a way that the clamp is vertically movable and the movement thereof recordable on the micrometer. All procedures for positioning the strip and setting the capacitive micrometer housing position are the same for both calibration and operation, the only change being the substitution of mechanical micrometer clamping means. The strip is then driven by the mechanical micrometer to increase or decrease the distance between the face or plane surface 21 of the sample 20 and the conductor plate 48 of the capacitive micrometer circuit by known amounts, and the voltage output of the capacitive micrometer circuit is recorded for each distance change. As an example of how this procedure works, in one device built according to the present invention, the linear region of the overall calibration curve indicated a total strip displacement corresponding to ±20 microinches per inch strain and produced a total voltage change of 40 volts, giving a calibration factor of one volt per microinch per inch. The sensitivity reflected by the calibration factor can be altered by varying the fixed frequency of the sine wave voltage source in the oscillator circuit. This alteration is effected by varying capacitors 81 and 82 by manipulating operating shafts 104 and 105, respectively. The sensitivity achieved by using static linear displacements is the same as that achieved by using periodic linear displacements. Therefore, the sensitivity achieved by the above described calibration is equally suitable for the measurement of both static and dynamic magnetostriction.

The following table of engineering data is included as exemplary of a successful embodiment of the present invention and is not intended in any way as a limitation thereof:

| Item | Size or Type |
|---|---|
| Vacuum tube 71 | 7A8 |
| Vacuum tubes 120, 143 | 5Y3 |
| Vacuum tubes 137, 138, 162, 163 | VR150 |
| Vacuum tube 220 | 12AX7 |
| Resistor 86 | 50 KΩ |
| Resistor 90 | 150 KΩ |
| Resistor 94 | 100 KΩ |
| Resistor 96 | 62 KΩ |
| Resistors 103, 177, 204, 206, 229 | 240 KΩ |
| Resistor 110 | 30 KΩ |
| Resistors 111, 227 | 10 KΩ |
| Resistor 112 | 20 KΩ |
| Resistors 140, 164 | 5 KΩ |
| Resistor 179 | 0.5 KΩ |
| Resistor 222 | 1 meg.Ω |
| Resistor 230 | 2500Ω |
| Capacitor 81 | 0.5–12 μμf. |
| Capacitor 82 | 1.0–3.0 μμf. |
| Capacitor 85 | 1000 μμf. |
| Capacitor 89 | 25 μf. |
| Capacitor 93 | 0.05 μf. |
| Capacitor 97 | 0.1 μf. |
| Capacitors 98, 100 | 75 μμf. |
| Capacitor 117 | 40 μf. |
| Capacitors 134, 159 | 20 μf. |
| Cappacitors 135, 160 | 40 μf. |
| Capacitor 191 | 3000 μf. |
| Capacitor 202 | 500 μf. |
| Capacitor 226 | 1 μf. |
| Choke 99 | 5 mH |
| Chokes 133, 158, 190, 192 | 10 H |

The method, herein described, by which the device of the invention measures magnetostriction comprises a series of fundamental operations which can be performed with any suitable apparatus and is not limited to the device herein described.

The inventive method for determining the magnetostrictive properties of a sample of magnetic material comprises the steps of positioning the sample a predetermined distance from a conductive reference element, permeating the sample with a magnetic field of a predetermined strength and direction, and determining the change in length of the sample in the direction of the field by detecting the change in electric capacitive coupling between the sample and the element.

Stated another way, the improved method for measuring magnetostriction in a sample of magnetic material comprises the steps of placing the sample a measured distance from a conductive reference element, passing an alternating current serially through the sample and the reference element, inducing in the sample a magnetic field of a predetermined strength and direction, and determining the change in length of the sample due to the action of the field thereon by determining the change in the alternating current due to changes in the electric capacitive coupling between the sample and the element when the sample changes length.

Stated still another way, the improved method for determining magnetostriction in a sample of magnetic material comprises the steps of assembling the sample with a conductive reference element to form a capacitor having as its plates the sample and the element, passing alternating current through the capacitor, subjecting the sample to a magnetic field of predetermined strength and direction, and determining the change caused by changes in the length of sample in the direction of the field in response thereto.

It will be understood that the particular embodiments of this invention described herein and illustrated in the drawings are exemplary only and the invention as applied to methods and devices for measuring magnetostriction is intended to include such modification and equivalents as may readily occur to persons skilled in the art, the invention being limited only by the terms of the appended claims.

It is claimed and desired to secure by Letters Patent:

1. An improved device for measuring the magnetostriction in a sample of magnetic material comprising in combination: a base; first and second posts mounted normal to said base and in abutting relationship thereto, said posts being in spaced relation to each other; collars for detachably securing said posts to said base; an electrically grounded strip of magnetic material having one end presenting an as-sheared plane surface and a second end; a coil form interposed between said posts in parallel relationship thereto, said coil form being open to receive said strip for free axial movement therein; a plurality of coil form supports for supporting the extremities of said coil form, said coil form supports being detachably secured to said posts and extending therefrom; a magnetizing coil surrounding said coil form and connected to a source of alternating current for inducing a magnetic field in said sample; a low valued noninductive resistor in series with said magnetizing coil for providing a voltage directly proportional to the magnetizing force produced by said coil in said strip; a neutralizing coil surrounding said coil form for neutralizing the effect of stray D. C. magnetic fields and connected to a source of direct current; three detecting coils positioned one on each end and one on the center of said coil form for monitoring the time-derivative-of-magnetic-flux-density induced in said strip by said magnetizing coil; an integrating circuit connected to said detecting coils for integrating said time-derivative-of-magnetic-flux-density to produce an output signal voltage directly proportional to the magnetic flux in said strip; means positioned above said coil form of clamping said second end of said strip, said clamping means extending between said posts and being detachably connected thereto; an electric conductor plate having a plane surface positioned below said coil form in opposing relation to said as-sheared plane surface of said strip and adapted to be moved toward and away from said strip; a capacitive micrometer circuit having an electric oscillator circuit, a vacuum tube, and a tuned circuit, said oscillator circuit being connected to a fixed frequency sine wave source, said tuned circuit having said electric conductor plate electrically connected therein, said plate cooperating with said plane surface of said strip to provide a variable air capacitor in said tuned circuit, said tuned circuit absorbing more energy from said oscillator circuit as said variable capacitor in said tuned circuit moves its resonant frequency nearer to the frequency of said oscillator circuit, and said tuned circuit absorbing less energy from said oscillator circuit as said variable capacitor in said tuned circuit moves its resonant frequency further away from the frequency of said oscillator circuit, said tuned circuit and said oscillator circuit being electrically coupled in said vacuum tube, said vacuum tube having a plurality of grids, one of said grids being connected in said tuned circuit and the remainder of said grids being connected in said oscillator circuit, said energy absorption of said tuned circuit being reflected by a directly proportional plate current in said tube, said plate current providing an output signal voltage directly proportional to the magnetostriction of said sample; an electrically shielded housing supporting said plate and containing said micrometer circuit, said housing being interposed between said posts and between said coil form and said base; a table for supporting said housing movable in a path parallel to said posts, said table being interposed between said housing and said base, said table having a plurality of pins extending therefrom; a plurality of guide means for maintaining said table in said path during said movement thereof, one of said guide means being affixed to said first post and extending therefrom toward another of said guide means affixed to said second post, said guide means having holes therethrough; a sleeve positioned in each of said holes for receiving said pins in slidable engagement therewith; adjusting means detachably secured to said base and supporting said table for movement along said path to move said plate away from and toward said sample; electric indicating means; and means for selectively impressing the respective signal voltages obtained from said noninductive resistor, said intergrating circuit, and said capacitive micrometer circuit upon said indicating means.

2. An improved device for measuring the magnetostriction in a sample of magnetic material comprising in combination: a base; first and second posts mounted normal to said base and in abutting relationship thereto, said posts being in spaced relation to each other; collars for detachably securing said posts to said base; a sample of magnetic material having one end presenting an as-sheared plane surface; a coil form interposed between said posts in parallel relationship thereto, said coil form being open to receive said sample for free axial movement therein; a plurality of coil form supports for supporting the extremities of said coil form, said coil form supports being detachably secured to said posts and extending therefrom; a magnetizing coil surrounding said coil form and connected to a source of alternating current for inducing a magnetic field in said sample; means in series with said magnetizing coil for providing an output signal voltage directly proportional to the magnetizing force produced by said coil in said sample; a neutralizing coil surrounding said coil form for neutralizing the effect of stray D. C. magnetic fields and connectable to a source of direct current; a plurality of detecting coils positioned on said coil form for monitoring the magnetic flux induced in said sample by said magnetizing coil; an integrating circuit connected to said detecting coils for providing a signal voltage directly proportional to the magnetic flux in said sample; means positioned above said coil form for clamping said sample remote said end presenting said plane surface, said clamping means extending between said posts and being detachably connected thereto; an electric conductor plate having a plane surface positioned below said coil form in opposing relation to said as-sheared plane surface of said sample and adapted to be moved toward and away from said sample; means for electrically grounding said sample; a capacitive micrometer circuit having said electric conductor plate electrically connected therein, said plate cooperating with said plane surface of said sample to provide a variable capacitor in said micrometer circuit, said circuit providing an output signal voltage directly proportional to the magnetostriction of said sample; a capacitive micrometer circuit housing electrically shielding said circuit and supporting said plate, said housing being interposed between said posts and between said coil form and said base; a table for supporting said housing movable in a path parallel to said posts, said table being interposed between said housing and said base, said table having a plurality of pins extending therefrom; a plurality of guide means for maintaining said table in said path during the movement thereof, one of said guide means being affixed to said first post and extending therefrom toward another of said guide means affixed to said second post, said guide means having holes therethrough; a sleeve positioned in each of said holes in said guide means for receiving said pins in slidable engagement therewith; adjusting means detachably secured to said base and supporting said table for movement along said path to move said plate away from and toward said sample; electric indicating means; and means for selectively impressing said output signal voltages upon said indicating means, said voltages being directly proportional to magnetizing force, magnetic flux density, and magnetostriction respectively.

3. An improved device for measuring the magnetostriction in a sample of magnetic material having one end presenting a plane surface, said analyzer comprising in combination: a base; first and second posts detachably secured normal to said base and in spaced relation to each other; a coil form interposed between and detachably secured to said posts in parallel relationship thereto, said coil form being open to receive the sample for free axial movement therein; a magnetizing coil surrounding said coil form and connected to a source of alternating current for inducing a magnetic field in the sample; means adjacent said coil form for neutralizing the effect of any stray D. C. magnetic fields; clamping means adjacent said coil form for clamping the sample remote the end having the plane surface, said clamping means being detachably connected to and extending between said posts; an electric conductor plate having a plane surface positioned adjacent said coil form in opposing relation to the plane surface of the sample and capacitively coupled thereto, said plate being movable toward and away from the sample; means for conductively connecting the sample, said clamping means, and said posts; a capacitive micrometer circuit having said electric conductor plate electrically connected therein, said circuit being electrically grounded and producing an output signal voltage directly proportional to the magetostriction of the sample; a capacitive micrometer circuit housing electrically shielding said circuit and supporting said plate, said housing being interposed between said posts between said coil form and said base; a table for supporting said housing movable in a path parallel to said posts, said table being interposed between said housing and said base, said table having a plurality of pins extending therefrom; a plurality of guide means for maintaining said table in said path during said movement thereof, one of said guide means being affixed to said first post and extending therefrom toward another of said guide means affixed to said second post, said guide means having holes therethrough; a sleeve positioned in each of said holes for receiving said pins in slidable engagement therewith; adjusting means detachably secured to said base and supporting said table for movement along said path to move said plate away from and toward the sample; electric indicating means; and means for impressing said output signal voltage provided by said capacitive micrometer circuit upon said indicating means.

4. An improved device for measuring the magnetostriction in a sample of magnetic material comprising in combination: a base; a plurality of spaced posts detachably secured normal to said base; a sample of magnetic material having at least one end presenting a plane surface; a coil form detachably secured to said posts in parallel relationship thereto, said coil form being open to receive said sample for free axial movement therein; exciting means surrounding said sample for inducing a cyclic magnetic field in said sample; compensating means surrounding said sample for neutralizing the effect of any stray D. C. magnetic fields; means positioned adjacent said coil form and detachably secured to said posts for supporting said sample; an electric conductor plate having a plane surface positioned in opposing relation to said plane surface of said sample and movable toward and away from said surface of said sample in a path parallel to said posts, said plate and said sample providing a variable capacitor; a shielded capacitive micrometer circuit having said variable capacitor electrically connected therein, said circuit being responsive to the magnetostriction of said sample; a plurality of guide means for maintaining said plate in said path during said movement thereof; electric indicating means; and means for impressing said response of said capacitive micrometer circuit upon said indicating means.

5. An improved device for measuring the magnetostriction in a sample of magnetic material comprising in combination: a base; a plurality of spaced posts detachably secured normal to said base; a sample of magnetic material having at least one end presenting a plane surface, said sample being securable to said posts; exciting means surrounding said sample for inducing a magnetic field in said sample; compensating means surrounding said sample for neutralizing the effect of stray D. C. magnetic fields; means for securing said sample to said posts; an electric conductor having a plane surface positioned in opposing relation to said plane surface of said sample and movable relatively thereto in a path parallel to said posts, said conductor being capacitively coupled to said sample to provide a variable capacitor; a shielded capacitive micrometer circuit having said variable capacitor electrically connected therein, said circuit being responsive to the magnetostriction of said sample; electric indicating means; and means for impressing said response of said capacitive micrometer circuit upon said indicating means.

6. An improved device for measuring the magnetostriction of a sample of magnetic material comprising in combination: a sample of magnetic material; means for supporting said sample; exciting means surrounding said sample for inducing a cyclic magnetic field having a predetermined direction in said sample; and a shielded capacitive micrometer circuit capacitively coupled to a surface of said sample normal to the direction of said field, said circuit being responsive to and measuring the magnetostriction magnitude and direction of said sample.

7. An improved device for measuring the magnetostriction of a sample of magnetic material comprising in combination: a base; a plurality of spaced posts detachably secured normal to said base; a coil form detachably secured to and interposed between said posts in parallel relationship thereto; a magnetizing coil surrounding said coil form for inducing a magnetic field in the sample positioned therein and connected to a source of energy; electric means responsive to said magnetic field for translating the magnetizing force and flux density of said field into output signal voltages; clamping means positioned adjacent said coil form and detachably secured to said posts for securing a portion of the sample; a shielded capacitive micrometer circuit capacitively coupled to a nonsecured portion of the sample and responsive to the change in length of the sample normal to said coupling resulting from said magnetic field, said circuit translating said change in length of said sample into an output signal voltage; an indicating device; and means for impressing said out signal voltages upon said indicating device.

8. A device for measuring the magnetostriction of a sample of magnetic material comprising in combination: a sample of magnetic material; means for supporting said sample having a base; a plurality of hollow posts mounted normal to said base, and a clamping means interposed between said posts and detachably secured thereto; exciting means surrounding said sample for inducing a cyclic magnetic field having a predetermined direction in said sample; a shielded capacitive micrometer circuit capacitively coupled to a surface of said sample normal to the direction of said field, said circuit being responsive to and measuring the magnetostriction of said sample.

9. A device according to claim 8 in which said hollow posts are filled with a heavy viscous sound energy absorbing fluid.

10. A device for measuring the dynamic magnetostriction of a sample of magnetic material comprising in combination: a sample of magnetic material; means for supporting said sample; exciting means surrounding said sample for inducing a cyclic magnetic field having a predetermined direction in said sample, said exciting means comprising a coil form detachably secured to said means for supporting said sample, said coil form for containing a portion of said sample therein and defining a small clearance between said form and said sample for air damping the transverse and flexural vibrations of said sample without introducing frictional interference of air damping into the longitudinal vibrations of said sample, and a magnetic circuit surrounding said coil form; a shielded capacitive micrometer circuit capacitively coupled to a surface of said sample normal to the direction of said field, said circuit being responsive to and measuring the magnitude and direction of the magnetostriction of said sample.

11. A device according to claim 10 in which said magnetic circuit is open and comprises: a uniformly wound magnetizing coil providing a predetermined magnetizing force in combination with means for providing additional magnetizing force at the ends of said sample to compensate the leakage occurring at said ends.

12. A device according to claim 11 in which said means for providing additional magnetizing force at the ends of said open circuit comprises an additional concentration of turns positioned on the ends of said uniformly wound coil.

13. A device according to claim 8 in which said clamping means secures said sample in the region of the center of mass of said sample, said means comprising a split clamping head having insulation therein to prevent the formation of a short circuiting coil around said coil form.

14. A device for measuring the magnetostriction of a sample of magnetic material comprising in combination: a sample of magnetic material comprising a plurality of strips; means for supporting said sample; exciting means surrounding said sample for inducing a cyclic magnetic field having a predetermined direction in said sample; and a shielded capacitive micrometer circuit having an electric conductor plate disposed in unobstructed spaced relationship to said strips and normal to the longitudinal axis thereof to provide a capacitive coupling between said circuit and said strips normal to the direction of said field, said circuit being responsive to and measuring the magnitude and direction of the magnetostriction of said strips.

15. A device for measuring a magnetostriction of a sample of magnetic material comprising: a sample of magnetic material; means for supporting said sample; exciting means surrounding said sample for inducing a cyclic magnetic field having a predetermined direction in said sample; and a shielded capacitive micrometer circuit capacitively coupled to a surface of said sample normal to the direction of said field, said circuit being responsive to and measuring the magnitude and direction of the magnetostriction of said sample, said capacitive micrometer circuit being enclosed and shielded by a housing and comprising a plurality of elements mounted on a common interior surface of said housing to reduce the effect of stray electrostatic fields and ambient mechanical vibrations.

16. A device for measuring the magnetostriction of a sample of magnetic material comprising in combination: a sample of magnetic material; means for supporting said sample; exciting means surrounding said sample for inducing a cyclic magnetic field having a predetermined direction in said sample; a shielded capacitive micrometer circuit capacitively coupled to a surface of said sample normal to the direction of said field, said capacitive micrometer circuit comprising an electric oscillator circuit, an electric conductor plate, and a tuned circuit, said oscillator circuit being connected to a fixed frequency sine wave power source, said tuned circuit having said electric conductor plate electrically connected therein, said plate cooperating with a surface of said sample to provide the opposed plates of a variable capacitor, said tuned circuit absorbing more and less energy from said oscillator circuit as said variable capacitor in said tuned circuit moves its resonant frequency nearer to and further away from said fixed frequency of said oscillator circuit, said tuned circuit being independent of and electrically coupled to said oscillator circuit, said shielded capacitive micrometer circuit being responsive to and measuring the magnitude of the magnetostriction of said sample.

17. A device for measuring the magnetostriction of a sample of magnetic material comprising in combination: a sample of magnetic material; means for supporting said sample; exciting means surrounding said sample for inducing a cyclic magnetic field having a predetermined direction in said sample; and a shielded capacitive micrometer circuit capacitively coupled to a surface of said sample normal to the direction of said field, said circuit being responsive to the magnetostriction of said sample and comprising an electric oscillator circuit, an electric conductor plate, and a tuned circuit, said oscillator circuit being connected to a fixed frequency sine wave power source, said tuned circuit having said electric conductor plate electrically connected therein, said plate cooperating with said surface of said sample to provide a variable capacitor, said tuned circuit absorbing more or less energy from said oscillator circuit as said variable capacitor in said tuned circuit moves its resonant frequency nearer to and further away from said oscillator circuit, said tuned circuit being electrically coupled to said oscillator circuit, said electric conductor comprising a rectangular block of a nonconductive material having a low dielectric constant and a sufficient dimension in said direction of said field to inhibit stray current flow between said exciting means and said capacitive micrometer circuit, said block having a first, second, third, fourth, fifth, and sixth plane external surface, said first surface being adjacent and in opposing relation to said sample and havin a thin metallic film coated thereon, said film being bounded on the said first surface by an area devoid of said metallic film for preventing the flow of interfering currents to said film, said devoid area being bounded on said first surface by an area coated with a thin metallic film, said coated area extending from said devoid area to the outer extremities of said first surface, said second surface being adjacent said first surface and normal thereto, said second surface having two discrete areas coated with a thin metallic film and a portion intermediate said discrete areas, said portion extending in said direction of said field and being devoid of said metallic film, said third, fourth, fifth, and sixth surfaces having a thin metallic film coated thereon.

18. A device for measuring the magnetostriction of a sample of magnetic material comprising in combination: a sample of magnetic material; means for supporting said sample; exciting means surrounding said sample for inducing a cyclic magnetic field having a predetermined direction in said sample; and a shielded capacitive micrometer circuit capacitively coupled to a surface of said sample normal to the direction of said field, said circuit being responsive to the magnetostriction of said sample and comprising an electric oscillator circuit, an electric conductor plate, and a tuned circuit, said oscillator circuit being connected to a fixed frequency sine wave power source, said tuned circuit having said electric conductor plate electrically connected therein, said plate cooperating with said surface of said sample to provide a variable capacitor, said tuned circuit absorbing more or less energy from said oscillator circuit as said variable capacitor in said tuned circuit moves its resonant frequency nearer to and further away from said oscillator circuit, said tuned circuit being electrically coupled to said oscillator circuit, said shielded capacitive micrometer circuit being shielded and contained by a housing, said housing having an opening defined therein for presenting said electric conductor plate coplanar with an external surface of said housing, said plate and said housing having an air gap interposed therebetween and coplanar therewith.

19. An improved device for measuring the magnetostriction of a sample of magnetic material comprising in combination: a sample of magnetic material; means for supporting said sample; a coil form surrounding said sample and detachably securable to said sample supporting means; exciting means surrounding said coil form for inducing a cyclic magnetic field having a predetermined direction in said sample contained therein; a plurality of coil form supports for detachably securing said coil form to said sample supporting means; a capacitive micrometer circuit capacitively coupled to a surface of said sample normal to said direction of said field, said circuit being responsive to the magnetostriction of said sample; a housing for shielding and containing said capacitive micrometer circuit, said housing being adjacent said coil form and movable toward and away therefrom; and stop means for limiting the movement of said housing toward said coil form, said stop means being interposed between said housing and one of said coil form supports in cooperative relationship therewith.

20. A device for determining the magnetic characteristics of a sample comprising in combination: an exciting solenoid surrounding the sample; means for causing an alternating current component in said solenoid so as to subject the sample to a cyclic magnetic field; pickup coils disposed within the field of said solenoid for producing a voltage determined by the time rate of change of the magnetic flux within said solenoid; detecting means in series with said solenoid for producing a voltage proportional to the magnetizing force within said solenoid; a capacitive micrometer electrically coupled with the sample for producing a voltage being responsive to and measuring the magnitude of the magnetostriction of the sample, said micrometer having a plate member in spaced relationship to said sample and cooperating therewith to provide the opposed spaced plates of a variable air capacitor; and electric means for selectively comparing said voltages.

21. A device for measuring the magnetostriction of a sample of magnetic material comprising in combination: a sample of magnetic material; means for supporting said sample; exciting means surrounding said sample for inducing a cyclic magnetic field having a predetermined direction in said sample; a shielded capacitive micrometer circuit capacitively coupled to a surface of said sample normal to the direction of said field, said circuit being responsive to and measuring the magnitude and direction of the magnetostriction of said sample; and a neutralizing coil positioned adjacent said sample for neutralizing stray D. C. magnetic fields.

22. A device for measuring the magnetostriction of a sample of magnetic material comprising in combination: a sample of magnetic material; means for supporting sample for free vibration thereof; exciting means surrounding said sample in closely spaced relationship thereto for inducing a cyclic magnetic field having a predetermined direction in said sample, said exciting means comprising a coil form detachably secured to said means for supporting said sample, said coil form having means defined therein for containing a portion of said sample therein and providing a small clearance between said form and said sample for air damping the transverse and flexural vibrations of said sample without introducing frictional interference or air damping into longitudinal vibrations of said sample, and an open magnetic circuit surrounding said coil form; and a shielded capacitive micrometer circuit capacitively coupled to an end surface of said sample normal to the direction of said field, said circuit providing a signal directly proportional to the magnitude and direction of the magnetostriction of said sample.

23. A device for measuring the magnetostriction in a sample of magnetic material comprising in combination: a sample of magnetic material; means for supporting said sample for free vibration thereof; exciting means surrounding said sample for inducing a cyclic magnetic field having a predetermined direction in said sample; a capacitive micrometer circuit having an electric oscillator circuit, a tuned circuit having said sample contained as a capacitor plate therein, a multigrid electron tube and a D. C. power supply, said oscillator circuit and said tuned circuit having means interposed therebetween for electrostatically and magnetically shielding said circuits from each other and from deleterious atmospheric phenomena, said oscillator circuit and said tuned circuit being connected to said tube and interacting within said tube to provide a net change in D. C. power drawn by the anode of said tube from said D. C. power supply; and means for measuring said net change in D. C. power drawn by said anode of said tube.

24. A device for measuring the magnetostriction of a sample of magnetic material comprising in combination: a sample of magnetic material; means for supporting said sample; exciting means surrounding said sample for inducing a cyclic magnetic field having a predetermined direction in said sample; and a shielded capacitive micrometer circuit having an electric conductor plate disposed in unobstructed spaced relationship to said sample and normal to the longitudinal axis thereof to provide a capacitive coupling between said circuit and said sample, said coupling being responsive to and measuring the magnitude and direction of the longitudinal movement of the sample in response to said magnetic field.

25. A device for measuring magnetostriction comprising: a measurable sample of magnetic material; means for supporting said sample; exciting means surrounding said sample for causing magnetostriction in said sample; and a shielded capacitive micrometer circuit having an electrical sensing plate disposed in unobstructed spaced opposed relationship to said sample to provide a capacitive coupling between said circuit and said sample, said coupling being responsive to and measuring the magnitude and direction of the magnetostriction of said sample.

References Cited in the file of this patent

UNITED STATES PATENTS

| | | |
|---|---|---|
| 2,030,101 | De Lanty | Feb. 11, 1936 |
| 2,114,889 | Stratton | Apr. 19, 1938 |
| 2,312,888 | Everest | Mar. 2, 1943 |
| 2,596,752 | Williams | May 13, 1952 |
| 2,610,230 | Wiegand | Sept. 9, 1952 |

UNITED STATES PATENT OFFICE
CERTIFICATE OF CORRECTION

Patent No. 2,850,697 September 2, 1958

Clarence W. Little, Jr.

It is hereby certified that error appears in the printed specification of the above numbered patent requiring correction and that the said Letters Patent should read as corrected below.

Column 15, line 40, for "form of clamping" read -- form for clamping --; column 16, line 13, for "intergrat-" read -- integrat- --; column 18, lines 29 and 30, strike out "magnetostriction"; line 30, before "said sample" insert -- magnetostriction of --; column 19, line 41, after "measuring" strike out "a"; column 20, line 32, for "havin" read -- having --.

Signed and sealed this 11th day of November 1958.

(SEAL)
Attest:

KARL H. AXLINE
Attesting Officer

ROBERT C. WATSON
Commissioner of Patents